United States Patent [19]

Yates

[11] 4,097,356

[45] Jun. 27, 1978

[54] CHLORINE GENERATOR

[76] Inventor: Dow Yates, 212 Westwood Dr., Friendswood, Tex. 77546

[21] Appl. No.: 831,485

[22] Filed: Sep. 8, 1977

[51] Int. Cl.$^2$ .............................................. C25C 7/00
[52] U.S. Cl. .................................... 204/237; 204/263; 204/266
[58] Field of Search ................ 204/237, 263, 266, 234

[56] References Cited

U.S. PATENT DOCUMENTS

| | | | |
|---|---|---|---|
| 2,887,444 | 5/1959 | Lindstaedt | 204/237 |
| 3,361,663 | 1/1968 | Murray et al. | 204/237 |
| 3,378,479 | 4/1968 | Colvin et al. | 204/237 |

*Primary Examiner*—R. L. Andrews
*Attorney, Agent, or Firm*—Arnold, White & Durkee

[57] ABSTRACT

A chlorine generator for the production of chlorine and hydrogen, with the chlorine being used for the treatment of swimming pools, sewage treatment facilities and drinking water is provided. The generator is characterized by an ion-permeable perfluorosulfonic acid membrane separating an anode and cathode compartment. Chlorine generation is controlled by an electrical timer, a chlorine pressure sensor gauge and, in an alternative embodiment, a chlorine sensor. Chlorine and hydrogen are withdrawn from the generator through aspirators and thereafter introduced into the water to be treated.

9 Claims, 4 Drawing Figures

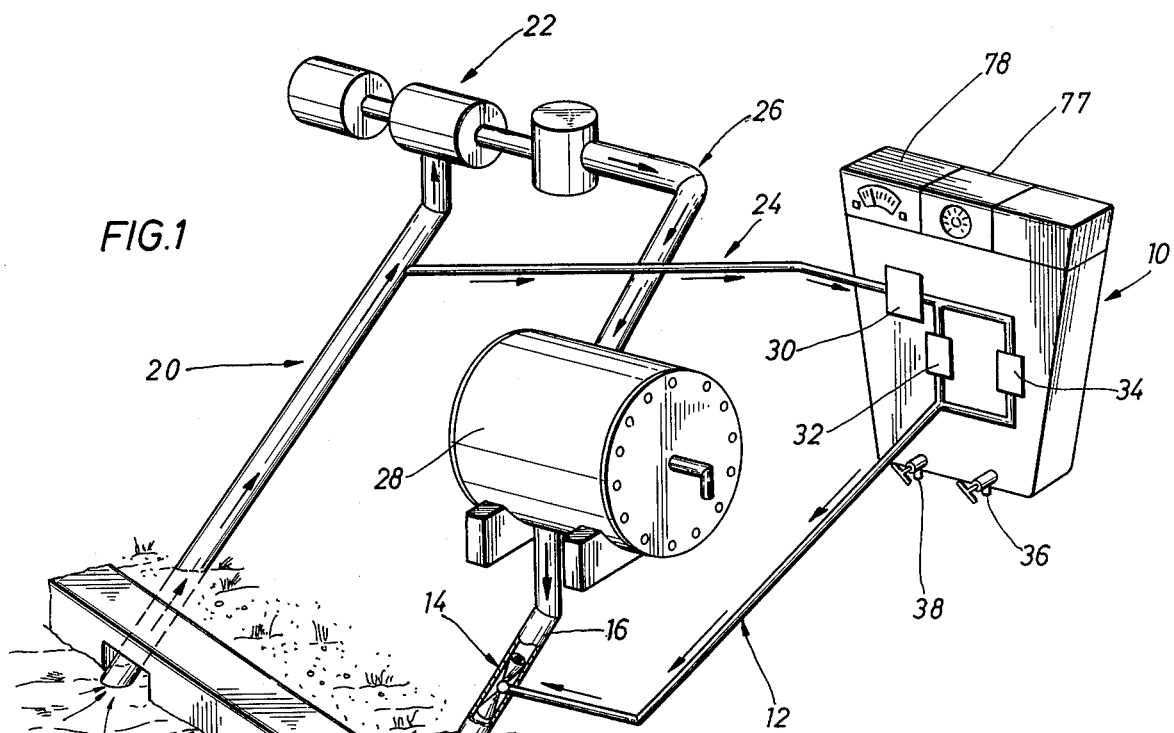
FIG. 1
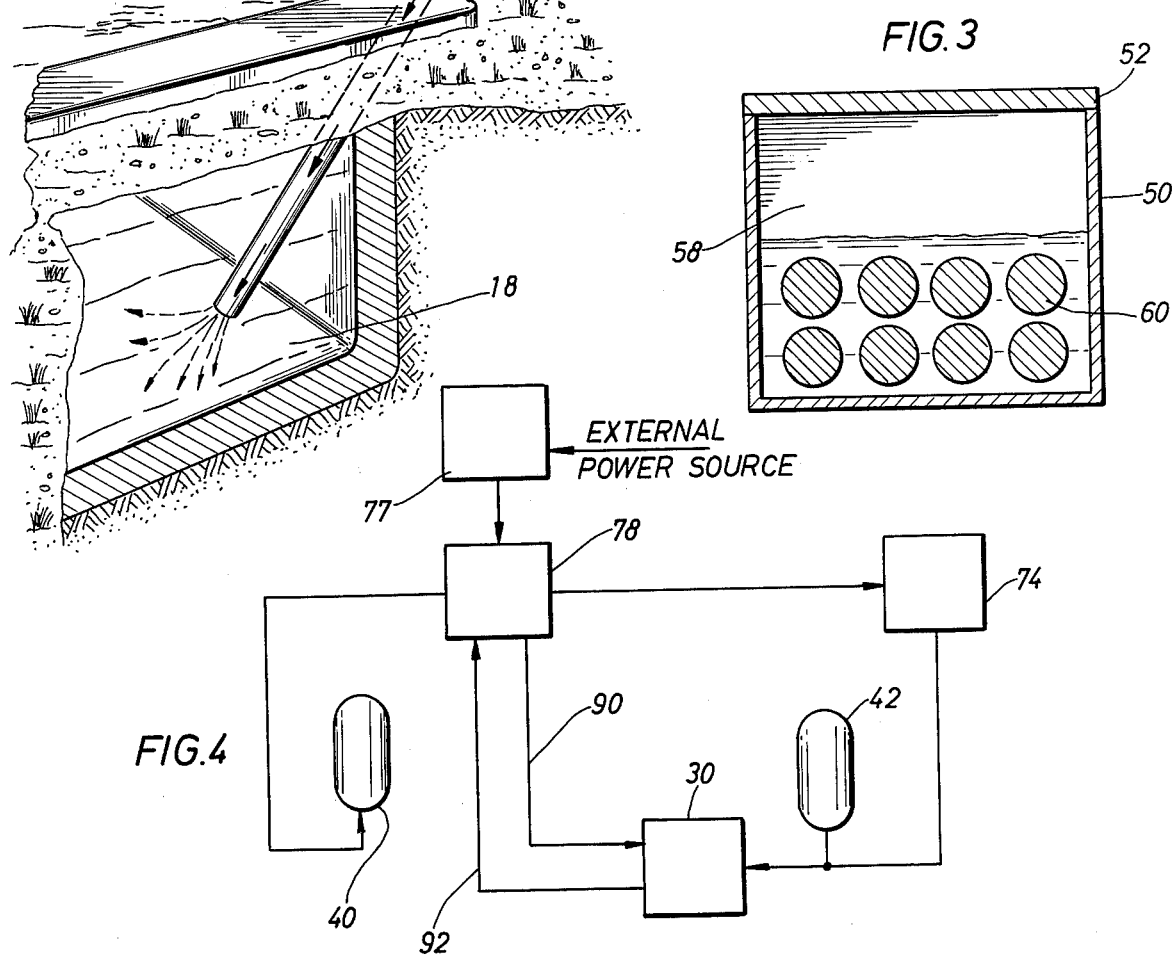
FIG. 3
FIG. 4

CHLORINE GENERATOR

BACKGROUND OF THE INVENTION

The generation of chlorine and its introduction to a water reservoir such as, for example, a swimming pool, is the subject of various patents, including Oldershaw et al, U.S. Pat. Nos. 3,351,542, Kirkham et al, 3,669,867, Lindstaedt, 2,887,444, and Murray, 3,223,242. However, these patents disclose generally complicated chlorine generation systems (Murray), the use of conceivably dangerous electrolyte solutions, such as hydrochloric acid (Oldershaw et al), the required adding of sodium chloride to a body of water and thereafter removing a portion of the saline solution from the body of water and subjecting it to electrolysis to generate chlorine (Lindstaedt) and a necessary cooling element for cooling at least one of the electrode compartments within the electrolytic cell (Kirkham).

Additionally, ion permeable membranes used in previous chlorine generator systems have ranged from, for example, asbestos diaphrams to perfluorosulfonic acid membranes such as described in a patent to Wamsley, U.S. Pat. No. 3,909,378. The perfluorosulfonic acid membranes as disclosed in the latter patent have been described in conjunction with a chlorine generator system in such publications as Dupont Magazine, May--June, 1973, page 22-25 and in a paper entitled "Perfluorinated Ion Exchange Membranes" by Grot, Munn and Wamsley, presented to the 141st National Meeting of the Electro-Chemical Society, Houston, Tex. May 7-11, 1972. Additional patents relating to perfluorosulfonic acid membranes used in electrolysis reactions include Dotson, U.S. Pat. Nos. 3,793,163, Danna, 3,775,272, and Carlin, 4,010,085.

The present invention relates to improvements in a process of and means for chlorinating swimming pools, small scale sewage treatment plants, and the like. Generally, selection criteria used for choosing an apparatus and process used in disinfecting a body of water, such as, for example, a swimming pool, require that the apparatus and process must be safe to use and not be so complex as to be difficult to operate; elimination of the circulation of undesirable waste products through the material to be disinfected; the apparatus must provide an efficient, low cost operation and must be capable of controlling the amount and time of chlorine production.

SUMMARY OF THE INVENTION

Accordingly, the present invention meets the above criteria by providing a chlorine generator capable of efficient, low cost production of chlorine for use as a disinfectant while maintaining a high degree of safety in the chlorine generation system. The chlorine generator is provided with a housing which is separated into two compartments by an ion-permeable perflurosulfonic acid membrane. An electrode is provided within each compartment with the electrodes being attached to a DC power supply. Each compartment is further provided with gas conduit tubes such that chlorine generated in the anode compartment is removed from this compartment via the chlorine gas conduit; a hydrogen gas conduit is also provided for removing hydrogen from the cathode compartment. A chlorine aspirator and a hydrogen aspirator are also provided, with each being in communication with the respective conduit tubes. An inlet line, in communication with the body of water to be disinfected, is attached to both the chlorine aspirator and the hydrogen aspirator such that the fluid flowing through the inlet line receives chlorine and hydrogen from the respective aspirators. The chlorine generator is also provided with a timer which activates the power supply for the generation of chlorine. As an additional control, the chlorine generator may also be provided with a chlorine sensor, locatable in the inlet line, which monitors the chlorine content of the fluids flowing through the inlet line and further activates the power supply whenever the chlorine content of the fluid falls below a predetermined level. As an additional safety feature, the chlorine generator is also provided with a pressure gauge located within the anode compartment, wherein the chlorine is generated, which measures the pressure of the chlorine so generated. The pressure gauge overides all previously noted controls and deactivates the power supply whenever the chlorine pressure in the compartment falls below a predetermined level.

BRIEF DESCRIPTION OF THE DRAWINGS

The description of the preferred embodiment of the apparatus of the present invention which hereafter follows is more particularly described with reference to the accompanying drawings of which:

FIG. 1 is a view of the apparatus of the present invention shown in conjunction with a swimming pool;

FIG. 3 is a partial cross-section of the partition dividing the anode compartment from the cathode compartment.

FIG. 4 is a block diagram of the circuit of the present invention showing the interrelation of the various control features of the present invention.

DESCRIPTION OF THE PREFERRED EMBODIMENT

Figure 2:
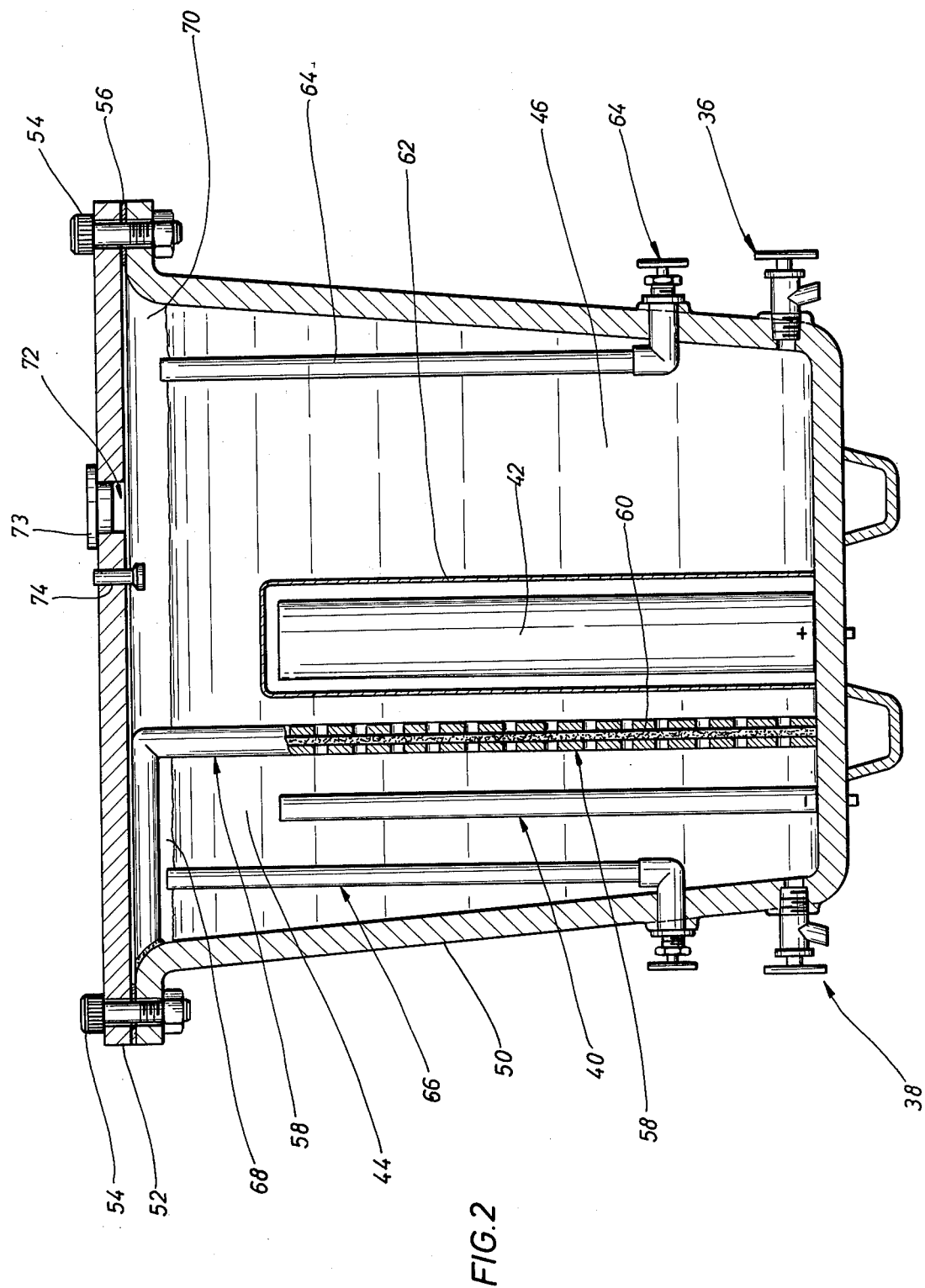
FIG. 2 is a cross section of the apparatus of the present invention.

Referring now to FIG. 1, the chlorine generator of the present invention is shown in conjunction with a swimming pool for the chlorination of the water in the pool. In FIG. 1, a swimming pool 18 is in fluid communication via a pipe 20 with a pump 22. The pump 22 removes water from the swimming pool 18 and circulates this water through a pipe 26 to a filtration system 28. The filtration system 28 may be any commercially available filtration system normally used in conjunction with the swimming pool 18. Additionally, a line 24 is connected to the pipe 20 such that water is withdrawn from the pipe 20 and thereafter split into two streams, with the first stream flowing through a chlorine aspirator 32 and the second stream flowing through a hydrogen aspirator 34.

Alternatively, the line 24 may be connected to the pipe 20 such that water may be withdrawn from the pipe 20 and circulated to a chlorine sensor 30 of a chlorine generator 10. The chlorine sensor 30 measures the amount of chlorine existing within the water flowing through the line 24 and hence is indicative of the chlorine concentration of the water in the swimming pool 18. The chlorine sensor 30, which may be any conventional chlorine sensor, is electrically connected to a power supply 78 of the chlorine generator 10 such that whenever the chlorine concentration in the water of the swimming pool 18 is below a predetermined level the power supply 78 is activated thereby causing the chlorine generator 10 to generate chlorine. As one skilled in the art will appreciate, the predetermined level of chlorine below which the chlorine sensor 30 activates the chlorine generator 10 is that level of chlorine within the water of the swimming pool 18 that is insufficient to disinfect the water. For example, the predetermined level may be 0.6 parts per million of chlorine in water.

After flowing through the chlorine sensor 30, the water in the line 24 is split into two streams, with the first stream flowing through the chlorine aspirator 32 and the second stream flowing through the hydrogen aspirator 34.

The chlorine aspirator 32 is connected to a chlorine gas release tube 64 (FIG. 2); the hydrogen aspirator 34 is connected to a hydrogen gas release tube 66 (FIG. 2) such that chlorine and hydrogen are removed from the chlorine generator 10 through the respective release tubes and into the chlorine aspirator 32 and the hydrogen aspirator 34. Whenever the chlorine sensor 30 detects low chlorine content in the water of the swimming pool 18 thereby causing the chlorine generator 10 to generate chlorine or whenever the chlorine generator 10 is activated by other control elements hereinafter described, the water passing through the chlorine aspirator 32 is mixed with chlorine generated by the chlorine generation, hydrogen is also produced. Thus, with water flowing through the hydrogen aspirator 34 and the chlorine generator 10 in operation, the water in the hydrogen aspirator 34 is mixed with hydrogen.

The chlorine aspirator 32 and the hydrogen aspirator 34 are connected to a common line 12 such that water flowing through the aspirators 32 and 34 flows to a venturi 14 contained within a return line 16. The line 16 is also connected to the filtration system 28 as the return line to the swimming pool 18. Accordingly, the water returning to the swimming pool 18 through the return line 16 has been substantially filtered by the filtration system 28 in addition to being chlorinated by the chlorine generator 10.

As the water enters the swimming pool 18, the hydrogen gas tends to bubble to the surface of the pool where it is dissipated in the atmosphere. However, the chlorine is retained within the water due to its solubility therein and is circulated throughout the pool, thereby adjusting the chlorine content of the water in the swimming pool. Of course, as one skilled in the art will appreciate, whenever the chlorine sensor 30 or the other hereinafter described control elements do not activate the chlorine generator 10, the water flowing through the chlorine aspirator 32 and the hydrogen aspirator 34 will not receive chlorine or hydrogen but instead returns to the swimming pool via the return line 16.

FIG. 2 depicts a cross-section of the chlorine generator of the present invention. The chlorine generator 10 comprises a tank 50 with a cover 52 attached thereto by, for example, bolts 54. Additionally, in order to provide a gas impervious seal between the tank 50 and the cover 52, a gasket 56 is positioned there between. The tank 50 is divided into a cathode compartment 44 and an anode compartment 46 by a partition 58. The partition 58 is attached to the tank in a manner to minimize the transfer of material from the cathode compartment 44 to the anode compartment 46 and visa versa. For example, by constructing the tank 50, the cover 52 and the partition 58 out of chemically-resistant fiberglass, it is only necessary to weld the partition 58, by any well-known fiberglass welding technique, to the tank 50.

The partition 58 holds in place an ion permeable membrane 60. The ion permeable membrane 60 preferred in the apparatus of the present invention is a membrane comprisesd of a fluorinated polymer such as, for example, a perfluorosulfonic acid polymer manufactured by E. I. Dupont and sold under the trademark NAFION and having the characteristic of permitting the transfer of $Na^+$ ions across the membrane from the anode compartment 46 to a cathode compartment 44. The exact method of securing the ion-permeable membrane 60 in the partition 58 is not critical to the present invention, provided sufficient surface area of the ion permeable membrane 60 is exposed. For example, the ion permeable membrane 60 may be sandwiched between two plates of the partition 58 with certain areas of the plates of the partition 58 having been first removed, as shown in FIG. 3.

The cathode compartment 44, which is defined by the inner wall of the tank 50 and the partition 58, is provided with a cathode 40 connected to the positive pole of the DC power supply 78 (FIG. 1). The cathode 40 may be made of any electrically conducting materials such as, for example, a stainless steel rod. Additionally, the cathode compartment 44 is provided with a hydrogen gas release tube 66 connected at the lowermost end thereof through the wall of the tank 50 to the hydrogen aspirator 34. Also provided in the cathode compartment 44 is a cathode drain 38 used both to fill the cathode compartment 44 with water and to drain the water therefrom.

Also contained within the tank 50 is an anode compartment 46 defined by the inner wall of the tank 50 and the partition 58. Contained within the anode compartment 46 is an anode 42 electrically connected to the negative pole of the power supply 78 (FIG. 1). Additionally, the anode compartment 46 is provided with a chlorine gas outlet tube 64, the lowermost end thereof being connected through the wall of the tank 50 to the chlorine aspirator 32. An anode drain 36 is also provided for draining the anode compartment 46. The anode 42, which may, for example, be a Grade GSXP carbon rod, is provided with a water permeable shield 62 placed around the anode 42 in such a manner as to prevent salt compaction against both the ion permeable membrane 60 and the anode 42.

In order to control the operation of the apparatus of the present invention, the chlorine generator 10 is provided with a timer 77 which is electrically connected to the power supply 78 such that the user may automatically or manually control the operation of the chlorine generator. The timer 77 which is connected to an external 110 v. AC power source (not shown) may be, for example, a 24 hour multiple program timer such as manufactured by Intermatic, Inc. and sold under the name Timeall and being capable of automatic timing or manual override. A chlorine pressure gauge 74 is also provided in the anode compartment 46 for purposes hereinafter described. The pressure gauge 74 is electrically connected to the power supply 78 to control operation of the chlorine generator 10.

Referring now to FIG. 4, a block diagram of the circuit use in the apparatus of the present invention is shown. The circuitry of the present invention is conventional and is easily designed without undue experimentation by one skilled in the art in order to meet the goals and needs of the present invention.

An external power supply (not shown) is connected to the timer 77, with the timer 77 thereby supplying current to the power supply 78. One output of a power supply 78, which may be, for example, a twelve volt DC power source, is attached to the cathode 40. The other output of the power supply 78 is connected to a pressure gauge 74. The pressure gauge 74 is electrically connected, in series, to the anode 42 or, alternatively, may be connected, in series, to the cathode 40. Additionally the anode 42 may be connected in series to the chlorine sensor 30 which receives power for its operation from the power supply 78 along a line 90. The output from the chlorine sensor 30 is applied along a line 92 to the power supply 78 in a manner such as to activate the power supply 78 whenever the chlorine content of the water flowing through the chlorine of sensor 30 falls below a predetermined level. Of course, as one skilled in the art will appreciate, the chlorine sensor 30 only activates the power supply 78 whenever the timer 77 is supplying current to the power supply 78. In an alternative embodiment of the apparatus of the present invention, the timer 77 is omitted and the external power source is directly connected to the power supply 78. In this instance, the chlorine sensor 30 is the main circuit element that controls activation of the power supply 78.

The apparatus of the present invention having been described above, it now remains to describe the present invention during operation.

In operation, water is introduced through the cathode drain 38 into the cathode compartment 44 and through the inlet port 72 into the anode compartment 46. Water is added to each compartment until the water level reaches the uppermost portion of the hydrogen gas release tube 66 and the chlorine gas release tube 64 but allowing the uppermost portion of these tubes to slightly protrude above the water level. By so filling the tank 50, a cathode gas pocket 68 exists in the cathode compartment 44 and an anode gas pocket 70 exists in the anode compartment 46. Solid sodium chloride is next introduced into the anode compartment 46 through the inlet port 72. The sodium chloride may be any size or grade of sodium chloride, with pelletized water conditioner grade sodium chloride being preferred. A gas tight cap 73 is then inserted into the inlet port 72 in order to effectively seal the anode compartment 46.

With water flowing through the line 24 and hence the chlorine aspirator 32 and the hydrogen aspirator 34, the power supply 78 is activated, thereby initiating production of chlorine in the anode compartment 46 and hydrogen in the cathode compartment 44. Both the hydrogen and the chlorine will tend to rise to the cathode gas pocket 68 and the anode gas pocket 70, respectively, with these gases being thereafter withdrawn from their respective gas pockets by the well-known action of the hydrogen aspirator 34 and the chlorine aspirator 32. Since the anode gas pocket 70 comprises a defined volume within the anode compartment 46, as chlorine is generated in the anode compartment a corresponding pressure attributable to the chlorine so generated is measured in the anode gas pocket 70 by the chlorine pressure gauge 74. The chlorine pressure gauge 74 is electrically connected to the power supply 78 such that if the pressure in the anode gas pocket 70 falls below a predetermined level, for example, by the cover 52 being punctured in the area of the anode gas pocket 70, the chlorine pressure gauge 74 will deactivate the power supply 78 in order to terminate chlorine production. Furthermore, in the preferred embodiment of the present invention, the chlorine pressure gauge 74 is electrically connected to the power supply 78 in such a manner as to override the signals from chlorine sensor 30 and the timer 77 thereby assuring that no chlorine is generated whenever the pressure on the anode gas pocket 70 falls below a predetermined level.

While the invention has been described with reference to particular exemplifications and embodiments thereof, modifications and changes may be made thereto while still falling within the intent and spirit of the present invention.

What is claimed is:

1. A chlorine generator comprising:
   a. a housing with separate anode and cathode compartments containing, respectively, an anode and cathode electrode therein, said housing separated by a fluorinated polymeric ion-permeable membrane to define said anode and cathode compartments, with said anode compartment adapted for receiving sodium chloride and water and said cathode compartment adapted for receiving water;
   b. a timer electrically connectable to an external power source for timing activation of said generator and further connected to a power supply for controlling the passage of a direct current through said electrodes;
   c. a chlorine aspirator in communication with said anode compartment for receiving chlorine generated in said anode compartment and a hydrogen aspirator in communication with said cathode compartment for receiving hydrogen generated in said cathode compartment;
   d. a conduit in fluid communication with said chlorine aspirator and said hydrogen aspirator;
   e. a pressure gauge in said anode compartment for measuring the gas pressure of the chlorine produced by said chlorine generator, with said pressure gauge electrically connected to said power supply and operable in response to a chlorine pressure below a predetermined level to deactivate said generator.

2. The chlorine generator of claim 1, wherein said fluorinated polymer ion-permeable membrane comprises a perflurosulfonic acid polymer.

3. The chlorine generator of claim 1, wherein said anode comprises a carbon rod and said cathode comprises a stainless steel rod.

4. A chlorine generator comprising:
   a. a housing with separate anode and cathode compartments containing, respectively, an anode and cathode electrode therein, said housing separated by a fluorinated polymer ion-permeable membrane to define said anode and cathode compartments, with said anode compartment adapted for receiving sodium chloride and water and said cathode compartment adapted for receiving water;
   b. a timer electrically connectable to an external power source for timing activation of said generator and further connected to a power supply for controlling the passage of a direct current through said electrodes;
   c. a chlorine aspirator in communication with said anode compartment for receiving chlorine generated in said anode compartment and a hydrogen aspirator in communication with said cathode compartment for receiving hydrogen generated in said cathode compartment;
   d. a conduit in fluid communication with said chlorine aspirator and said hydrogen aspirator;
   e. a chlorine sensor in fluid communication with said conduit for measuring the chlorine content of a fluid flowing through said conduit, with said chlorine sensor electrically connected to said power supply for activating said power supply in response to the chlorine content existing in said fluid;

f. a pressure gauge in said anode compartment for measuring the gas pressure of the chlorine produced by said chlorine generator, with said pressure gauge electrically connected to said power supply and said chlorine sensor and operable in response to a chlorine pressure below a predetermined level to deactivate said generator.

5. The chlorine generator of claim 4, wherein said fluorinated polymer ion-permeable membrane comprises a perflurosulfonic acid polymer.

6. The chlorine generator of claim 4, wherein said anode comprises a carbon rod and said cathode comprises a stainless steel rod.

7. A chlorine generator comprising:
a. a housing with separate anode and cathode compartments containing, respectively, an anode and cathode electrode therein, said housing separated by a fluorinated polymer ion-permeable membrane to define said anode and cathode compartments, with said anode compartment adapted for receiving sodium chloride and water and said cathode compartment adapted for receiving water;
b. a power supply for passing a direct current through said electrodes;
c. a chlorine aspirator in communication with said anode compartment for receiving chlorine generated in said anode compartment and a hydrogen aspirator in communication with said cathode compartment for receiving hydrogen generated in said cathode compartment;
d. a conduit in fluid communication with said chlorine aspirator and said hydrogen aspirator;
e. a chlorine sensor in fluid communication with said conduit for measuring the chlorine content of a fluid flowing through said conduit, with said chlorine sensor electrically connected to said power supply for activating said power supply in response to the chlorine content existing in said fluid;
f. a pressure gauge in said anode compartment for measuring the gas pressure of the chlorine produced by said chlorine generator, with said pressure gauge electrically connected to said power supply and said chlorine sensor and operable in response to a chlorine pressure below a predetermined level to deactivate said generator.

8. The chlorine generator of claim 7, wherein said flourinated polymer ion-permeable membrane comprises a perflurosulfonic acid polymer.

9. The chlorine generator of claim 7, wherein said anode comprises a carbon rod and said cathode comprises a stainless steel rod.

* * * * *